J. J. MORAND.
METHOD OF AND APPARATUS FOR MANUFACTURING CUSHION UNITS.
APPLICATION FILED MAR. 8, 1920.

1,369,695. Patented Feb. 22, 1921.

Inventor:
Joseph J. Morand,

UNITED STATES PATENT OFFICE.

JOSEPH J. MORAND, OF CHICAGO, ILLINOIS, ASSIGNOR TO MORAND CUSHION WHEEL CO., OF CHICAGO, ILLINOIS, A CORPORATION OF ILLINOIS.

METHOD OF AND APPARATUS FOR MANUFACTURING CUSHION UNITS.

1,369,695.          Specification of Letters Patent.        Patented Feb. 22, 1921.

Application filed March 8, 1920. Serial No. 364,196.

*To all whom it may concern:*

Be it known that I, JOSEPH J. MORAND, a citizen of the United States, residing at Chicago, in the county of Cook and State of Illinois, have invented a new and useful Improvement in Methods of and Apparatus for Manufacturing Cushion Units, of which the following is a specification.

This invention relates particularly to a method of and apparatus for manufacturing resilient cushion units for use in the manufacture of cushion wheels; and the primary object is to provide an improved method of manufacturing cushion units and improved apparatus adapted to the practice of the improved process.

Figure 1:
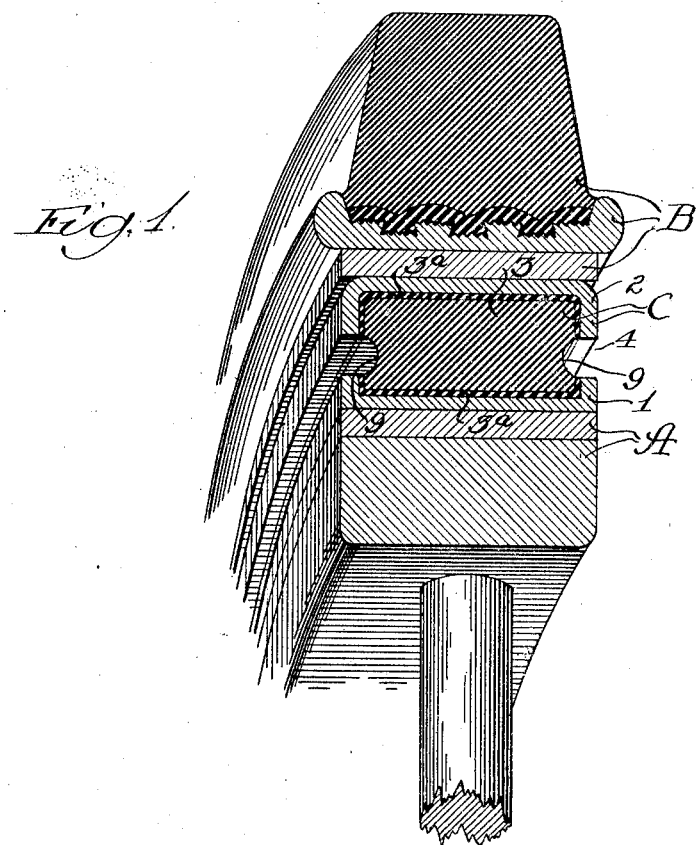
Figure 2:
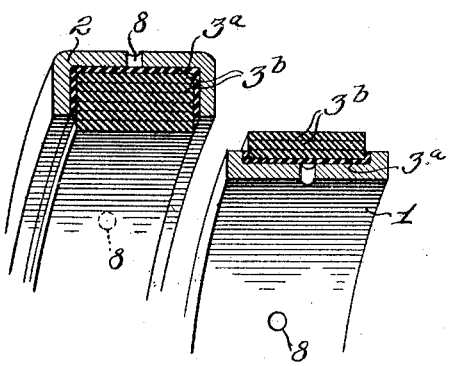

The invention is illustrated in the accompanying drawing, in which Figure 1 represents a broken sectional perspective view of a cushion unit made in accordance with the invention; Fig. 2, a broken sectional perspective view illustrating the manner in which the inner and outer cushion-rims employed are loaded with layers of vulcanizable rubber compound, preparatory to introducing one within the other; and Fig. 3, a broken sectional perspective view illustrating the manner in which the cushion-unit is confined in a mold during the vulcanizing operation.

Referring to Fig. 1, A represents a wheel; B, a tire; and C, a cushion-unit interposed between the wheel and tire, the inner cushion-rim of said unit being held by intense frictional force upon the wheel and the outer cushion-rim of said unit being held by intense frictional force within the tire.

The cushion-unit C comprises an inner cushion-rim 1, an outer cushion-rim 2, and a rubber cushion-element 3 interposed between and vulcanized to the cushion-rims. The body of the cushion-element 3 is composed of soft elastic rubber and surface coatings or layers 3ª of hard-rubber compound vulcanized to the cushion rims and to the soft-rubber.

In the illustration given, the cushion-rims are of channel form, with the flanges turned toward each other, and separated by spaces 4. The flanges of the inner rim 1 are preferably narrow or shallow, while the flanges of the rim 2 are relatively wide or deep. This arrangement is preferred, for the reason that the inner cushion-rim is backed by the strong felly of the wheel, while the relatively deep flanges of the outer cushion-rim serve to strengthen or reinforce the tire. The cushion-unit is forced onto the wheel under a pressure of many tons, so that the inner cushion-rim becomes rigid with the wheel and virtually a part thereof. The tire is forced onto the cushion-unit under a pressure of many tons, so that the outer cushion-rim becomes rigid with the tire and virtually a part thereof. In the use of the wheel, the rubber cushion-element C is subjected to compressive and distensive elastic action throughout the circumference of the structure. Thus, when the wheel-center is depressed, the rubber cushion-element will be compressed throughout the lower portion of the wheel and will be stretched or distended throughout the upper portion of the wheel.

Figure 3:
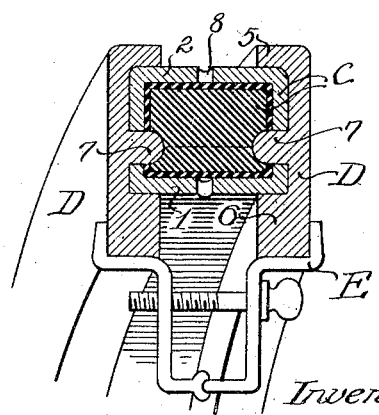

The preferred method of manufacture is illustrated in Figs. 2 and 3. Thus, the inner surfaces of the annular channels 1 and 2 are coated or covered with the coating or layer 3ª of hard-rubber compound; and the channels are loaded with layers or strips 3ᵇ of soft-rubber compound. These layers may be caused to adhere to each other and to the layers 3ª by rubber cement, if desired. The channels are so loaded that the layers 3ᵇ project more than flush with the edges of the flanges, so that when the inner loaded channel is introduced within the outer-loaded channel, the space between the webs of the cushion-rims will be completely filled. If desired, the exposed surfaces of the layers of rubber may be wet with gasoline to enable them to slip past each other in the operation of introducing the inner loaded rim within the outer loaded rim.

After such assembling operation, the cushion-unit C is introduced between lateral mold-plates D, and these mold-plates are then secured together, as by means of clamps E. The mold-plates are recessed to receive the the cushion-unit, thus providing upper and lower flanges 5 and 6 which embrace, respectively, the outer circumferential portion of the cushion-rim 2 and the inner circumferential portion of the cushion-rim 1. Thus, when the mold-plates D are clamped together, the elements of the cushion-unit will be properly positioned and securely held together. The mold-plates D are provided, at their inner sides, with annular ribs or beads 7 which project through the spaces between the flanges of the cushion-rims and exert pressure upon the lateral surfaces of the rubber element. The web portions of the cushion-rims are preferably provided at intervals throughout their circumferences with vent-openings 8. After the elements are assembled as shown in Fig. 3, the assembly is introduced into a vulcanizer and subjected to the usual vulcanizing operation. The effect is to thoroughly cure the rubber cushion-element and vulcanize it to the cushion-rim. It is preferred to cleanse the cushion-rims by subjecting them to the action of an acid solution and then brass-plate the inner surfaces of the channels before introducing the rubber compound. The effect is to insure thorough vulcanization of the rubber to the cushion-rims, so that the rubber will adhere with great tenacity to the rims at all points of contact. It has been demonstrated that the improved method will so firmly bind the rubber cushion-element to the cushion-rims at all points of contact as to enable the cushion element to effectively withstand any stretching action to which the cushion-unit may be subjected in use.

After the vulcanizing operation, the cushion-unit is applied to the wheel and the tire is then applied to the cushion-element in the manner described; or the method of assembling may be reversed, that is, the cushion-element may be first forced into the tire and then forced on to the wheel. The invention enables cushion-units thoroughly adapted to the construction of cushion wheels to be manufactured cheaply and in a form which enables such units to be readily introduced between the wheel and tire by a simple assembling operation; and it has been found that such units are exceedingly durable and may be held, by intense frictional force, between the tire and wheel, such frictional force being ample to withstand all stresses which are encountered in the use of the wheel.

The annular ribs or beads 7 of the mold-plates B are adapted to produce annular recesses in the sides of the rubber cushion-element. These recesses are designated 9 in Fig. 1. They serve to reduce or weaken the intermediate portion of the rubber cushion-element, thereby tending to improve the elastic action. They also serve to provide air chambers between the adjacent cushion-units, where a plurality of such units are interposed, for example, between a wheel having a wide felly and a wide tire. At the present time, wheels are constructed in varying widths, up to a width of fourteen inches; and, in the case of a wide wheel, as many cushion-elements may be interposed between the tire and wheel as may be necessary or desirable. It may be desirable, for example, to employ units of about two inches in width. In such case, seven units would be disposed side by side in the space between the tire and the wheel, and the lateral recesses of the cushion-units would afford complemental air spaces, extending circumferentially about the wheel.

The foregoing detailed description has been given for clearness of understanding only and no unnecessary limitations should be understood therefrom, but the appended claims should be construed as broadly as permissible in view of the prior art.

What I regard as new and desire to secure by Letters Patent is—

1. The method of forming a cushion-unit for cushion wheels, which comprises applying layers of vulcanizable rubber compounds to the inner side of an outer cushion-rim and the outer side of an inner cushion-rim, introducing the inner cushion-rim and its layer of rubber within the outer cushion-rim and its layer of rubber, introducing the assembled parts into a mold and subjecting the structure to a vulcanizing operation.

2. The method of forming a cushion-unit for cushion wheels, which comprises filling the space between inner and outer channel-form cushion-rims with vulcanizable rubber compound, clamping the unit between annular lateral mold-plates provided with annular ribs which project through the spaces between the flanges of the cushion-rims, and subjecting the structure to a vulcanizing operation.

3. The method of forming a cushion-unit for cushion wheels, which comprises loading channel-form cushion-rims with hard rubber compound coatings and layers of soft-rubber compound, said layers being thick enough to fill the space between the webs of the cushion-rims, introducing the inner loaded rim within the outer loaded rim, applying lateral mold-plates provided with annular beads which project into the spaces between the flanges of said rims, the web portions of said rims being provided with vents, and subjecting the structure to a vulcanizing operation.

4. Vulcanizing means for use in the manufacture of cushion-units for cushion wheels, comprising annular lateral mold-plates having flanges for embracing the circumferential portions of inner and outer cushion-rims, and having annular beads for engaging the lateral surfaces of rubber cushion-elements, and means for clampingly securing said mold-plates to the interposed cushion-rims.

5. Vulcanizing means for use in the manufacture of cushion-units for cushion wheels, comprising annular lateral mold-plates having flanges for embracing the circumferential portions of the inner and outer cushion-rims and having at their inner sides annular beads adapted to extend into the spaces between the annular rims and produce lateral annular recesses in the rubber cushion-elements.

JOSEPH J. MORAND.